(12) United States Patent
Sardo et al.

(10) Patent No.: US 8,904,952 B2
(45) Date of Patent: Dec. 9, 2014

(54) DEVICE FOR COATING FOOD PRODUCTS, IN PARTICULAR FRUITS AND VEGETABLES

(75) Inventors: Alberto Sardo, Chateaurenard (FR); Stefano Sardo, Chateaurenard (FR)

(73) Assignee: Xeda International, Saint Andiol (FR)

( * ) Notice: Subject to any disclaimer, the term of this patent is extended or adjusted under 35 U.S.C. 154(b) by 458 days.

(21) Appl. No.: 13/120,407

(22) PCT Filed: Sep. 22, 2009

(86) PCT No.: PCT/FR2009/051783
§ 371 (c)(1),
(2), (4) Date: Jul. 12, 2011

(87) PCT Pub. No.: WO2010/031983
PCT Pub. Date: Mar. 25, 2010

(65) Prior Publication Data
US 2011/0259263 A1   Oct. 27, 2011

(30) Foreign Application Priority Data

Sep. 22, 2008   (FR) ..................................... 08 56351

(51) Int. Cl.
| A23N 15/00 | (2006.01) |
| A23L 1/00 | (2006.01) |
| A23B 7/154 | (2006.01) |
| A23B 7/158 | (2006.01) |
| A23B 7/16 | (2006.01) |
| A23L 1/212 | (2006.01) |
| A23L 3/3517 | (2006.01) |
| A23N 15/06 | (2006.01) |
| A23P 1/08 | (2006.01) |

(52) U.S. Cl.
CPC .............. *A23L 1/0055* (2013.01); *A23B 7/154* (2013.01); *A23B 7/158* (2013.01); *A23B 7/16* (2013.01); *A23L 1/0061* (2013.01); *A23L 1/212* (2013.01); *A23L 1/2125* (2013.01); *A23L 3/3517* (2013.01); *A23N 15/06* (2013.01); *A23P 1/085* (2013.01)
USPC .................................. 118/16; 118/20; 118/13

(58) Field of Classification Search
None
See application file for complete search history.

(56) References Cited

U.S. PATENT DOCUMENTS

| 1,964,275 A | 6/1934 | Secondo |
| 2,033,044 A | 3/1936 | McDill et al. |

(Continued)

FOREIGN PATENT DOCUMENTS

| EP | 1 201 130 | * | 5/2002 | ............... A23B 7/16 |
| FR | 2 912 605 | | 8/2008 | |

(Continued)

OTHER PUBLICATIONS

Gundstone et al, Lipid Technologies and Applications, 1997, Marcel Dekker, pp. 463-468.*

(Continued)

*Primary Examiner* — Dah-Wei D Yuan
*Assistant Examiner* — Jethro Pence
(74) *Attorney, Agent, or Firm* — Kenyon & Kenyon LLP

(57) ABSTRACT

A device for coating food products, of the type having a coating area includes: a coating conveyor provided to drive said food products in a longitudinal direction; and a device for applying a coating compound on the food products driven on the conveyor. The coating conveyor includes a chassis, a plurality of rotary brushes fastened in the longitudinal direction relative to the chassis, and a motorized assembly for driving the brushes in rotation around respective transverse axes relative to the chassis, the brushes being arranged so as to define, together, a support and driving surface for the food products and being provided to make the food products roll during the application of the coating compound.

13 Claims, 1 Drawing Sheet

(56) References Cited

U.S. PATENT DOCUMENTS

| | | | |
|---|---|---|---|
| 2,372,225 A | | 3/1945 | Rieke |
| 2,866,709 A | | 12/1958 | Gerwe et al. |
| 3,818,859 A | | 6/1974 | Kalmar |
| 5,101,763 A | * | 4/1992 | Creason et al. ............... 118/683 |
| 5,148,738 A | * | 9/1992 | Orman et al. .................... 99/487 |
| 5,451,266 A | * | 9/1995 | Kirk et al. ..................... 134/25.3 |
| 2006/0228458 A1 | * | 10/2006 | Sardo ............................ 426/601 |
| 2010/0092631 A1 | | 4/2010 | Sardo | |

FOREIGN PATENT DOCUMENTS

| | | | | |
|---|---|---|---|---|
| KR | 10-0827758 | * | 5/2008 | ............. A23N 12/06 |
| KR | 100 827 758 | | 5/2008 | |

OTHER PUBLICATIONS

International Search Report, issued in corresponding International Application No. PCT/FR2009/051783.

Written Opinion, issued in corresponding International Application No. PCT/FR2009/051783.

* cited by examiner

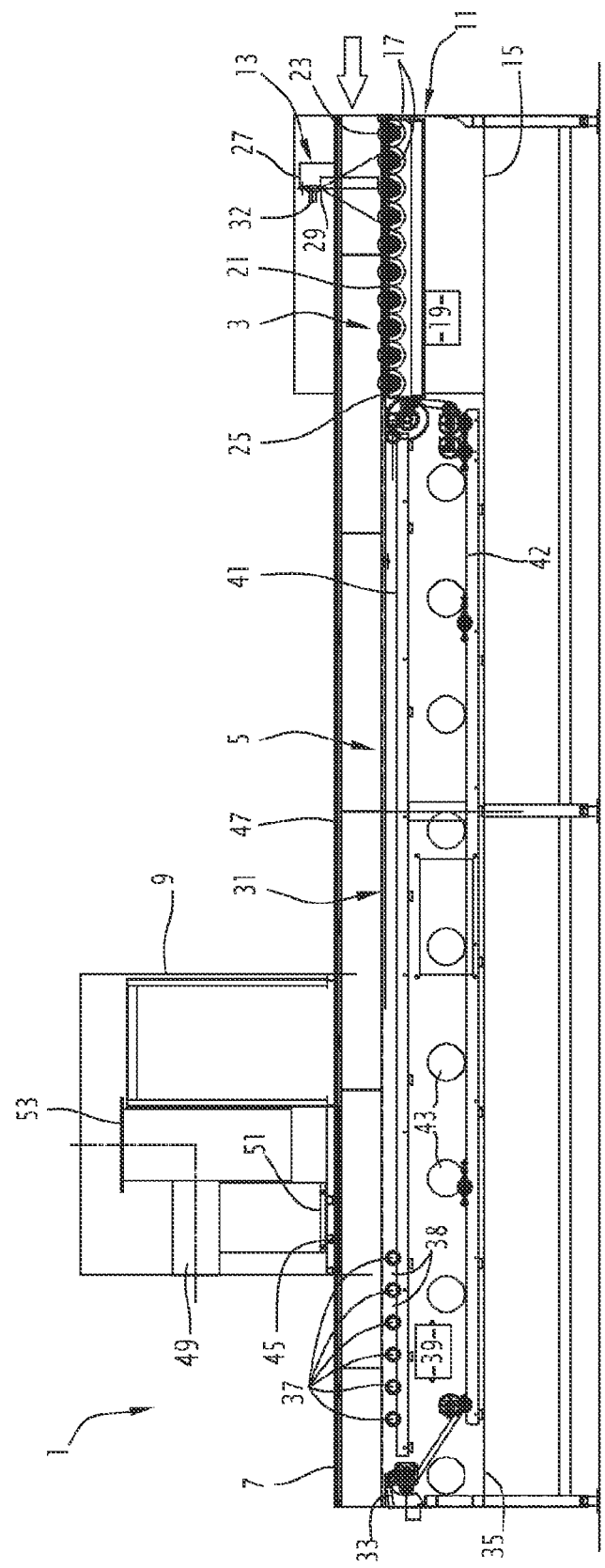

DEVICE FOR COATING FOOD PRODUCTS, IN PARTICULAR FRUITS AND VEGETABLES

FIELD OF THE INVENTION

The invention generally relates to the coating of food products, in particular fruits and vegetables.

More specifically, the invention relates to a device for coating food products, the device being of the type having a coating area including:
- a conveyor provided to drive said food products in a longitudinal direction;
- a device for applying a coating compound on the food products driven on the conveyor.

BACKGROUND INFORMATION

Such a device is known from FR 2 912 605.

It is difficult, in certain cases, to obtain a good quality application on food products.

Certain areas of the products may be poorly covered by the compound. The thickness of the layer can be poorly controlled.

SUMMARY

Example embodiments of the present invention provide a device allowing a better quality coating.

To that end, example embodiments of the present invention provide a device of the aforementioned type, in which the coating conveyor includes a chassis, a plurality of rotary brushes fastened in the longitudinal direction relative to the chassis, and a motorized assembly for driving the brushes in rotation around respective transverse axes relative to the chassis, the brushes being arranged so as to define, together, a support and driving surface for the food products and being provided to make the food products roll during the application of the coating compound.

The device can also have one or several of the features below, considered individually or according to all technically possible combinations.

The coating compound comprises one or several filmogenic agents in a solvent, the solvent being chosen from amongst water, an alcohol, or an alkane.

The filmogenic agent is shellac.

Said compound also comprises one or more terpenes.

Said compound also comprises a base.

The application device is provided to project the coating compound on the food products at a controlled pressure greater than the atmospheric pressure.

The application device comprises at least one projection member arranged above the coating conveyor, and a dosing member provided to supply the or each projecting member with coating compound at a controlled rate.

The brushes have an outer diameter between 60 and 180 mm.

The device has a drying area for food products comprising a drying conveyor provided to drive the coated food products exiting the coating area in a direction of travel, the drying conveyor comprising a chassis, a plurality of driving elements for driving the food products, and a motorized assembly for moving the driving elements in relation to the chassis in the direction of movement.

The driving elements have, in the direction of movement, a space at least 10 mm wide between them for the flow of air to dry the food products.

The drying area is arranged inside a closed enclosure, said closed enclosure including at least one air inlet, at least one air outlet, and at least one member provided to create an airflow in the closed enclosure from the air inlets to the air outlet.

The drying conveyor comprises a segment for moving the food products from the coating area to an outlet, the or each air inlet being situated at a level below the movement segment and the air outlet being situated at a level above the movement segment.

The airflow member has an air suction inlet and an air discharge outlet and is capable of creating, between the outlet and the inlet, a pressure difference greater than 30 mm of water column.

The driving elements are rollers.

Other features and advantages will emerge from the detailed description of example embodiments of the present invention provided below, in reference to the appended FIGURE, which is a diagrammatic elevation illustration of a coating device.

DETAILED DESCRIPTION

The device shown in the FIGURE is intended to coat food products, in particular fruits and vegetables. These products are generally coated with a filmogenic agent before marketing to improve their preservation and appearance for consumers.

The device 1 includes:
- an area 3 for coating the food products;
- an area 5 for drying the coated food products;
- a closed enclosure 7, in which the coating and drying areas 3 and 5 are arranged;
- a device 9 for ventilating the closed enclosure 7.

The coating area 3 includes a coating conveyor 11 provided to drive the food products in a longitudinal direction, and a device 13 for applying a coating compound on the food products driven on the conveyor.

The coating conveyor 11 comprises a chassis 15, a plurality of rotary brushes 17 mounted on the chassis 15, and a motorized assembly 19 for driving the brushes 17 in rotation around respective transverse axes relative to the chassis.

The brushes 17 are cylindrical, and each have an outer diameter between 60 and 180 millimeters, preferably between 80 and 120 millimeters. In any case, the brushes must have an outer diameter larger than the diameter of the food products to be treated.

The brushes 17 are fixed in translation in the longitudinal and transverse directions relative to the chassis 15. They therefore only have a single degree of freedom relative to the chassis 15, in rotation around their respective axes.

As shown in the FIGURE, the brushes 17 are arranged parallel to each other, and are regularly spaced longitudinally. The spacing is provided so that the brushes are substantially tangent to each other, or the bristles of each brush slightly penetrate the adjacent brushes. The axes of the brushes are situated in a same plane, substantially horizontal, so that the brushes together define a support and driving surface 21 for the food products. Thus, the food products deposited at an upstream end 23 of the surface 21 are driven by the brushes to the downstream end 25 of the surface 21. The brushes are provided to make the food products roll around during the longitudinal movement of said products from the upstream end towards the downstream end of the surface 21.

This rolling is first obtained by the fact that the surface 21 has bumps, at the apices of the brushes 17, and hollows between the brushes 17. A food product reaching the apex of a brush 17 will roll into the following hollow. Moreover, the bristles of the brushes 17, by bearing on the outer surface of the food product, tend to make that product rotate in the direction opposite the brush. The movement is similar to the driving of a gear by a pinion.

The motorized assembly 19 drives the brushes 17 in rotation around their respective axes. The brushes 17 are all made to rotate in the same direction, the direction of rotation being the counterclockwise direction in the illustration of the FIGURE.

The device 13 for applying the coating compound is provided to project the coating compound on the food products traveling on the coating conveyor 11, at a controlled pressure greater than the atmospheric pressure, and with a controlled flow rate. The pressure and the flow rate are chosen as a function of the type of food product to be treated, and as a function of the nature of the coating compound.

The application device typically comprises a vat 27 for storing a reserve of coating compound, a plurality of nozzles 29 longitudinally distributed above the conveyor 11, and a dosing member 32 provided to supply the nozzles 29 with coating compound from the vat 27. Only one nozzle 29 is shown in the FIGURE.

The nozzle can be of any suitable type. It typically includes a tip making it possible to adjust the width of the jet of coating compound projected towards the conveyor. The dosing member 32 is for example an adjustable flow dosing pump.

The projection tips of the nozzles are typically placed 15 centimeters above the surface 21 on which the food products move.

The flow rate of the coating compound is typically between 1 and 10 liters per ton, preferably 2 and 5 liters per hour. The supply pressure of the nozzles is typically between 1 and 10, preferably 2 and 5, bars.

The drying area 5 comprises a drying conveyor 31 provided to drive the coated food products from the downstream end 25 of the surface 21 to an outlet 33, through which the dried food products leave the coating device.

The drying conveyor 31 is of the mobile roller type, and includes a chassis 35, a plurality of rollers 37 for driving the food products, and a motorized assembly 39 for moving the driving rollers relative to the chassis.

The chassis can be shared or separate from that of the coating conveyor 11.

The conveyor 31 includes two segments, a transport segment 41 along which the rollers 37 drive the food products from the coating area 3 to the outlet 33, and a return segment 42 making it possible to bring the rollers 37 back from the outlet 33 towards the downstream end 25 of the surface 21.

The transport segment 41 is rectilinear and longitudinally extends the coating conveyor.

The return segment 42 is also rectilinear. It is situated under the transport segment 41.

The rollers 37 are for example generally cylindrical and arranged parallel to each other, their respective axes being transversal. They have an outer diameter between 5 and 60 millimeters, preferably substantially equal to 10 millimeters. They are longitudinally spaced apart from each other, so as to form a space at least 10 millimeters wide between them, for example 10 to 40 millimeters wide, preferably 25 millimeters wide. The width here is measured in the direction of movement. The spaces 38 left between the rollers 37 allow the flow of air to dry the food products.

The enclosure 7 includes a plurality of air inlets 43, longitudinally distributed along the drying conveyor. The air inlets 43 are situated, in the vertical direction, below the transport segment 41 of the conveyor and above the return segment 42.

The enclosure 7 also includes an air outlet 45, formed on the roof 47 of the enclosure.

The ventilation device 9 includes an air extractor 49, the suction 51 of which is connected to the air outlet 45. The extractor 49 is for example mounted on the roof 47 of the enclosure. It is typically of the centrifugal type. The extractor is preferably a high power extractor, so as to allow a significant flow of ventilation air in the drying area, from the air inlets 43 to the air outlet 45, and to allow fast drying of the food products and maintain a low alcohol concentration in the air (below the flammability threshold).

The extractor 49 for example has a pressure difference between the air suction inlet 51 and the air discharge outlet 53 greater than 30 millimeters of water column, preferably greater than 60 millimeters of water column, and typically equal to 70 millimeters of water column.

Although the device is not limited regarding the nature of the coating compounds applied, it is particularly suited to the application of food product coating compounds using a filmogenic agent.

A filmogenic agent is any agent capable of forming a permeable or semipermeable edible film capable of reducing and/or preventing gas exchanges between said food product and the ambient air with a base of resin(s) suitable for coating food products.

The resin(s) can be chosen from amongst coumarone-indene resin, shellac, or resins including abietic acid, and/or one or more abietic acid ester(s), or mixtures thereof, such abietic acid ester(s) being chosen from amongst abietic acid ester with glycerol or pentaerythritol. Said resins that include abietic acid, one or more abietic acid ester(s), or mixtures thereof are preferably chosen from amongst the resins ester gum, Pexalyn®, Pentalyn®, and Permalyn®.

The coating compound may also include one or more terpenes, in particular chosen from amongst non-oxygenated terpenes, such as the pinenes and limonene.

"Food product" refers to any food, such as fruits, vegetables, cheeses, or eggs, in particular those normally coated for preservation, especially fruits or vegetables.

In the first respect, said filmogenic agent is in solution in a solvent.

Advantageously, said solvent is selected from amongst water and a light alcohol or alkane, in particular a C2-C3 alcohol or a C6-C10 alkane. Suitable alcohols and alkanes include without limitation ethanol and hexane.

The use of alcohol as a solvent is particularly advantageous in that it acts to disinfect or sterilize the food product of any contamination on its surface.

Preferably, if a water-soluble solvent, such as an alcohol, is used, the compound of the coating should additionally include a base. In fact, a substantial loss of resin solubility in said water-soluble solvent may result in the presence of residual humidity (e.g., water condensation on the food products to be treated, ambient humidity). This loss of solubility also causes a low-quality coating, such that the food products so treated will not have the desired shiny appearance. The addition of a base into the water-soluble-solvent-based coating compound allows for improved solubility of the resin in the solvent in the presence of water, such that the coating is of satisfactory quality even in the presence of water.

More preferably, the compound can be chosen from amongst:
  solutions of shellac in an alcohol and/or water;
  solutions of abietic acid, abietic acid esters, and/or mixtures thereof in an alcohol and/or water, with or without a terpene, solutions of coumarone-indene resins in an alkane and/or water or mixtures thereof;
solutions of lecithin(s) and/or derivatives in water,
solutions of carboxymethylcellulose in water,
solutions of polymerized sugar derivatives in water.

The compounds disclosed by the invention generally include:
between 1% and 35% by weight in resin(s);
between 0% and 50% by weight in terpene(s);
between 15% and 99% by weight in solvent; and
between 0 and 10% by weight of base.

As a comparison, the compound may be, in particular, one of the following:
coumarone-indene in hexane;
glyceryl abietate in ethyl alcohol;
shellac in ethyl alcohol;
with or without limonene and/or a base.

We can in particular cite shellac-based compounds in ethanol, possibly comprising terpene(s), base(s) and/or abietic acid ester(s).

More precisely, the following compounds are preferred:
shellac: 9%,
ethyl alcohol: 89%,
ammonia: 2%;
or
coumarone-indene resin: 7%
hexane: 93%;
or
glyceryl abietate: 11%,
ethyl alcohol: 67%,
morpholine: 2%,
limonene: 20%;

The above compounds may also include other solvents, vegetable oils, or emulsifiers.

The percentages indicated here are by weight.

The coating compounds are preferably applied in their pure state, without prior dilution.

The amount of compound to be applied depends on the nature of the food products in question and the method of application selected. Generally, between 1000 and 5000 cm3 of the compound is applied per ton of food product, preferably between 2 and 10 liters/t.

The solvent of the compounds in solution is generally evaporated in air by aspiration followed by extraction or absorption.

Resins may include, in particular, coumarone-indene resins, shellac resins (E904), pine resins, abietic acid, or abietic acid esters such as esters with glyceryl or pentaerythritol (E445), and resins chemically ester-modified by creating the maleic or fumaric adduct, or mixtures thereof.

The expression "abietic acid ester(s)" refers to one or more esters of abietic acid with an alcohol, mixtures thereof, as well as any resin including one or more abietic acid esters or mixtures thereof. In particular, the ester of abietic acid with glyceryl or pentaerythritol is preferred, or, more preferably, glyceryl abietate. These include, in particular, the commercial resins Ester Gum, Pexalyn®, or Pentalyn®, marketed by Hercules Inc., or Permalyn®, marketed by Eastman.

Non-oxygenated terpenes may include pinenes and limonene, especially limonene.

The expression "fruits or vegetables" refers preferably to citrus fruits such as oranges, limes, clementines, pineapples, mandarin oranges, or apples, or any fruit or vegetable that is normally resin coated.

The various surfactants or emulsifiers are known to persons skilled in the art. According to example embodiments of the present invention, "emulsifier" refers to any agent normally used for this purpose, such as ethoxylated fatty alcohols, ethoxylated fatty acids, ethoxylated alkylphenols, or any other nonionic product.

The surfactants preferably used in the present context are anionic or nonionic surfactants.

Examples of nonionic surfactants that can be used include without limitation the product of condensation of an aliphatic fatty acid, preferably C8-C22, with a C2-C3 alkylene oxide. The C2-C3 alkylene oxide may be ethylene oxide, propylene oxide, or a mixture of ethylene oxide and propylene oxide in any proportions. An example of such surfactants is the condensation product of lauryl alcohol (or n-dodecyclic alcohol) with 30 moles of ethylene oxide.

The emulsifiers may also contain other agents customarily used in coating waxes.

The nonionic emulsifiers include, in particular, sucroesters, ethoxylated moneolate sorbitans, ethoxylated fatty acids, lecithin, and ester-modified fatty acids such as glyceryl oleate, and mixtures thereof.

Examples of anionic surfactants that can be used include in particular: alkaline salts of fatty acids with base, organic or mineral, such as alkaline metal hydroxides (soda or potash), ammonia, or amine(s). The salt may be introduced into the compound or formed in situ.

However, the use of these specific surfactants should not be considered limiting.

Bases may include organic or mineral bases such as alkaline metal hydroxides (soda or potash), ammonia, or amine-type bases, such as diethylamine, morpholine.

Generally, the base is between 0 and 10% by weight of the coating compound, preferably between 0.1 and 5%, more preferably between 1 and 5%.

Preferably, the application of the compound is done after the harvest and before marketing of the food products, at ambient temperature. The compounds can be applied once or several times.

Preferably, the compounds are applied on food products that are dried beforehand.

The operation of the coating device described above will now be explained in detail.

The coated food products are deposited at the upstream end 23 of the surface 21 of the coating conveyor. They are deposited manually by an operator, or brought by another conveyor (not shown).

The food products are driven longitudinally from the upstream end 23 to the downstream end 25 by the brushes 17. The brushes 17 are driven in rotation in the counterclockwise direction in the FIGURE by the driving assembly 19.

The bristles of the brush slide against the skin of the food products while driving said products longitudinally.

Food products that are generally round, e.g. apples, pears, citrus fruits, potatoes, etc. roll from their longitudinal movements on the coating conveyor.

During the movement of the food products on the conveyor, the application device 13 projects the coating compound towards the food products. The pump 32 suctions the coating solution into the tank 27 and discharges compound towards the nozzles 29 at a determined pressure and a determined flow rate. The nozzles 29 project the coating compound downwards, i.e. towards the food products. Because the food products roll on the surface of the conveyor, all of the areas of the skin of the food product are successively rotated towards the nozzles and receive a dose of coating compound. Thus, because the food products roll on the conveyor and because of the use of an application device making it possible to project the coating compound at a controlled flow rate and pressure on the food products, excellent control is possible of the thickness of the coating compound deposited on the surface of the food product, as well as a particularly even application on the entire skin of the food product.

The food products leave the coating conveyor at the downstream end 25 of the surface 21 and go directly to an upstream end of the transport segment 41 of the drying conveyor 31.

They are then wedged between two rollers 37 of the drying conveyor, the space between two rollers being provided for the food products to be able to be wedged there stably, and without falling between two rollers through the space 38 provided for the airflow.

The rollers 37 are then driven longitudinally towards the discharge 33, by the motorized assembly 39. They drive the food products with them. The food products do not roll during their movements along the drying conveyors and generally remain immobile relative to the rollers 37. Upon reaching the outlet 33, they are manually removed by operators to be packaged or are, for example, picked up by another conveyor.

The air extractor 49 suctions air inside the enclosure 7, through the air outlet 45. It releases the air into the atmosphere. It thus creates an airflow inside the enclosure 7, from the air inlets 43 to the air outlet 45. It also creates an airflow from the outside towards the inside of the enclosure 7 at the outlet 33 and at the upstream end 23 of the surface 21.

The air penetrating the enclosure 7 through the air inlets 43, situated under the transport segment 39, moves upwards through the spaces 38 formed between the rollers 37, up to the air outlet 45.

By passing between the rollers 37, it passes over the food products, which contributes to drying the coating compound.

Preferably, the closed enclosure 7 has a transverse width that is only very slightly larger than the transverse width of the rollers 37, such that the majority of the air coming in through the air inlets 43 is forced to flow through the spaces 38 between the rollers 37.

The airflow extracted by the extractor 49 is controlled at a high value. This offers two advantages. The coating compound dries particularly quickly on the food products. Thus, it is possible to dry not only the superficial layers of coating compound, but also the layers of coating compound that are not directly in contact with the air, and are in contact with the skin of the food product. With a low airflow, it is sometimes difficult to dry the layer of coating compound in depth, the superficial layers solidifying while the deepest layers remain moist. Moreover, drying the coating solution quickly makes it possible to shorten the drying conveyor length, and therefore to decrease the cost of the coating device.

Moreover, the fact that the coating compound contains a very volatile solvent of the alcohol or alkane type contributes to the fast drying of the coating solution on the drying conveyor.

Thus, the coating device described above makes it possible to obtain a good quality coating, for all kinds of food products.

The fact that the coating conveyor includes brushes provided to make the food products roll during the application of the coating compound contributes to the obtainment of an even film of coating compound with a controlled thickness on the food products. The thickness of the film can thus be adjusted as a function of the nature of the food product, each food product needing to be treated in a specific way for optimal preservation over time.

Moreover, drying is also optimized so as to allow fast drying of the coating compound over the entire thickness of the film of coating solution. This is due, inter alia, to the fact that the coating compound includes a solvent of the alcohol or alkane type, the rollers of the drying conveyor are spaced away from each other to create an airflow space, and a particularly powerful air extractor is used.

The coating device can assume several alternative embodiments.

The number of rollers of the coating conveyor can vary depending on what is needed. The number of nozzles can also vary, a single nozzle being possible, or a large number of nozzles, depending on the type and size of the food products to be treated, the speed of movement of the food products on the surface of the coating conveyor, the type of coating compound, etc.

The application device may not be of the type provided to project the coating compound at a pressure higher than the atmospheric pressure. The application device may be a showering device, provided to make the coating compound run over the food products, at a pressure corresponding to the atmospheric pressure. The application device could also be a device for spraying by misting or atomization.

The drying conveyor is not necessarily aligned with the coating conveyor.

The drying conveyor can, in place of the rollers 37, include other types of elements for driving the food products. These elements can be of any type and form, and can be made from any type of material.

The air extractor 49 can be replaced by a fan provided to blow air inside the enclosure 7, through the air inlet 43.

The invention claimed is:

1. A device for coating food products, comprising:
a coating area;
a coating conveyor adapted to drive the food products in a longitudinal direction;
an application device adapted to apply a coating compound on the food products driven on the coating conveyor; and
a drying area for the food products, the drying area including a drying conveyor adapted to drive the coated food products exiting the coating area in a direction of travel, the drying conveyor including a drying chassis, a plurality of driving devices adapted to drive the food products, and a motorized assembly adapted to move the driving devices in relation to the drying chassis in the direction of travel;
wherein the coating conveyor includes a coating chassis, a plurality of rotary brushes arranged in the longitudinal direction relative to the coating chassis, and another motorized assembly adapted to drive the brushes in rotation around respective transverse axes relative to the coating chassis, the brushes arranged so as to define, together, a support and driving surface for the food products and adapted to make the food products roll during application of the coating compound;
wherein the driving devices have, in the direction of travel, a space at least 10 mm wide between them for flow of air to dry the food products;
wherein the driving devices are adapted to drive along the drying chassis in the direction of travel and are arranged such that the food products remain generally immobile relative to the driving devices when the driving devices move along the drying conveyor;
wherein the driving devices are spaced apart from one another and the food products are wedged stably between the driving devices when the driving devices move along the drying conveyor; and
wherein the drying conveyor has a transport segment and a return segment, the driving devices each adapted to move by the motorized assembly in the direction of travel with the food products along the transport segment from an upstream end thereof to a downstream end thereof, the driving devices adapted to be brought back along the return segment from the downstream end to the upstream end.

2. The device according to claim 1, wherein the coating compound includes at least one filmogenic agent in a solvent, the solvent including at least one of (a) water, (b) an alcohol, and (c) an alkane.

3. The device according to claim 2, wherein the at least one filmogenic agent includes shellac.

4. The device according to claim 1, wherein the compound includes at least one terpene.

5. The device according to claim 1, wherein the compound includes a base.

6. The device according to claim 1, wherein the application device is adapted to project the coating compound on the food products at a controlled pressure greater than atmospheric pressure.

7. The device according to claim 6, wherein the application device includes at least one projection member arranged above the coating conveyor, and a dosing member adapted to supply the projection member with the coating compound at a controlled rate.

8. The device according to claim 1, wherein the brushes have an outer diameter between 60 and 180 mm.

9. The device according to claim 1, wherein the drying area is arranged inside a closed enclosure, the closed enclosure including at least one air inlet, at least one air outlet, and at least one airflow member adapted to create an airflow in the closed enclosure from the air inlet to the air outlet.

10. The device according to claim 9, wherein the drying conveyor includes a movement segment adapted to move the food products from the coating area to an outlet, the air inlet arranged at a level below the movement segment and the air outlet arranged at a level above the movement segment.

11. The device according to claim 9, wherein the airflow member includes an air suction inlet and an air discharge outlet and is adapted to create, between the air outlet and the air inlet, a pressure difference greater than 30 mm of water column.

12. The device according to claim 1, wherein the driving devices include rollers.

13. The device according to claim 1, wherein the driving devices are spaced apart from one another such that the food products do not roll when the driving devices move along the drying conveyor.

\* \* \* \* \*